July 9, 1946.                     R. LEE                    2,403,447
                         ALTERNATING CURRENT MOTOR
                         Filed Sept. 25, 1944        2 Sheets-Sheet 1
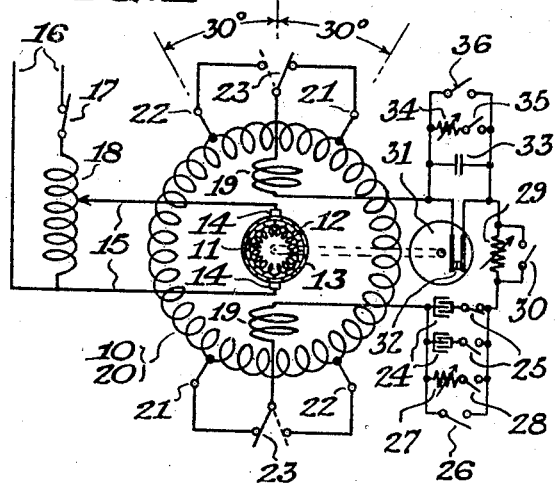
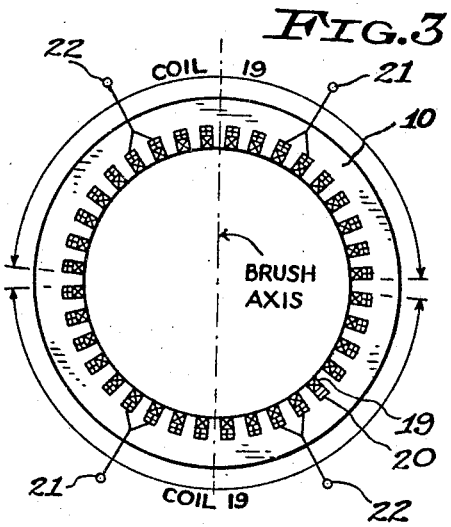
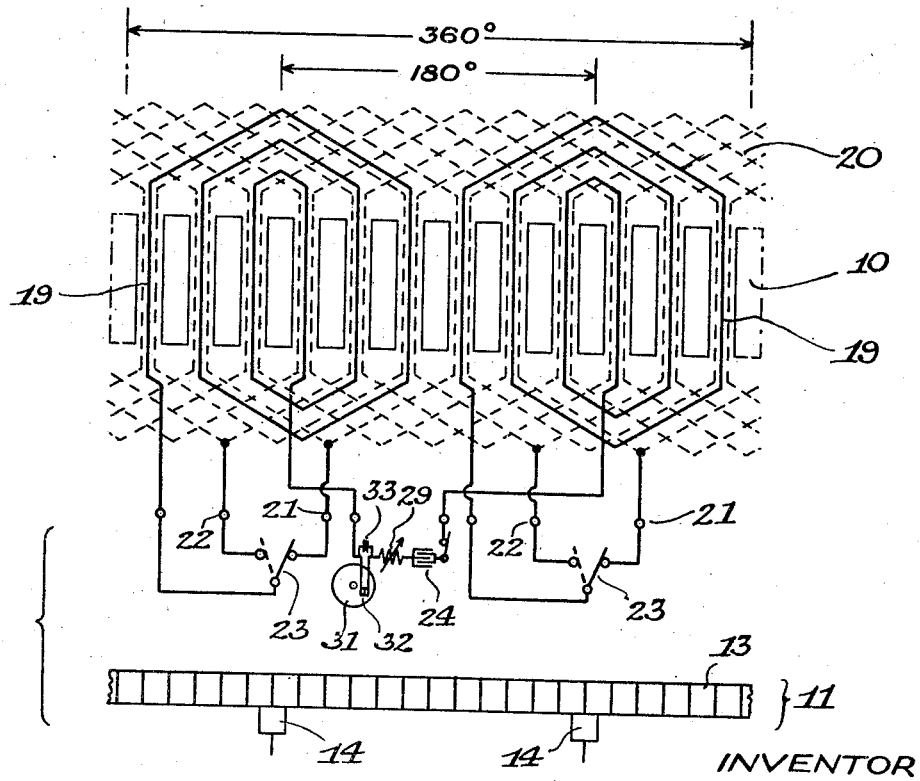
INVENTOR
ROYAL LEE
BY Christopher L. Waal
ATTORNEY July 9, 1946.  R. LEE  2,403,447
ALTERNATING CURRENT MOTOR
Filed Sept. 25, 1944  2 Sheets-Sheet 2
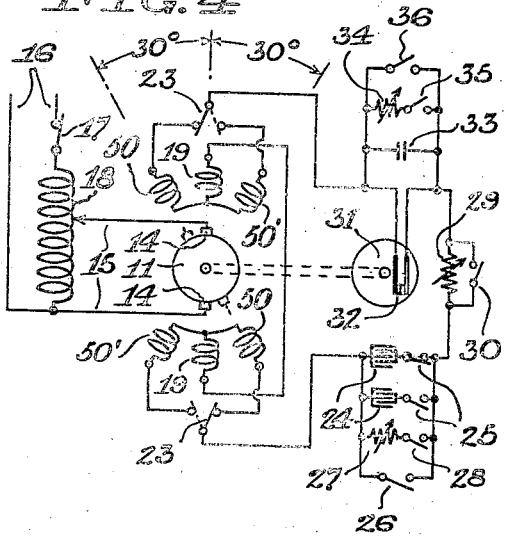
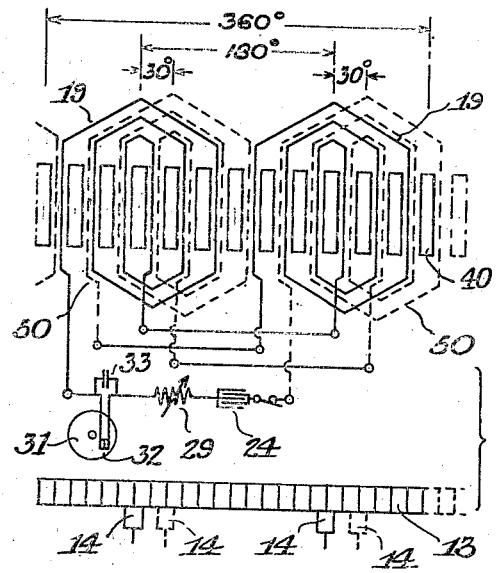
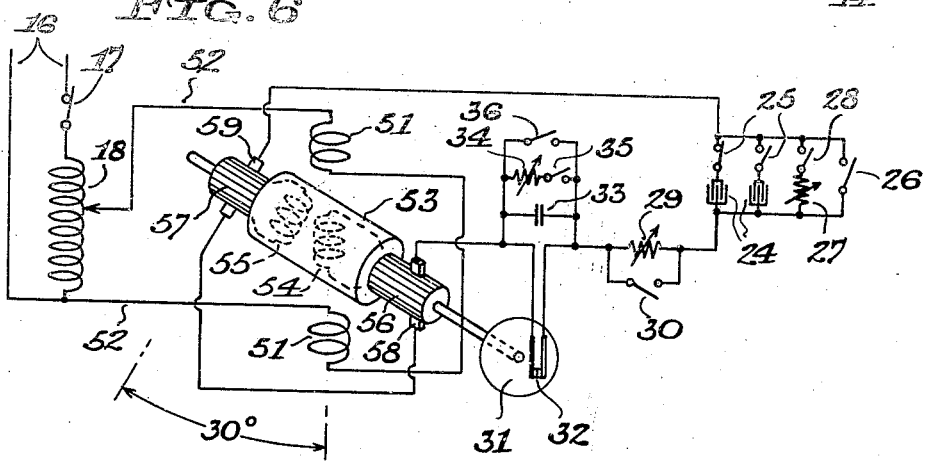
INVENTOR
ROYAL LEE
BY Christopher L. Waal
ATTORNEY Patented July 9, 1946

2,403,447

UNITED STATES PATENT OFFICE 2,403,447

ALTERNATING CURRENT MOTOR

Royal Lee, Milwaukee, Wis.

Application September 25, 1944, Serial No. 555,705

14 Claims. (Cl. 172—276)

1

The present invention relates to alternating current motors of the commutator type.

Repulsion motors and similar single-phase commutator motors with primary and secondary windings and possessing series characteristics have heretofore been devised. Motors of this general type have been open to various objections, such as noisy operation, limited speed range and low efficiency.

An object of the invention is to provide an improved single-phase commutator motor which shall be quiet and efficient in operation over a wide range of speed and load.

Another object is to provide a motor of this type which shall run smoothly and quietly when under the control of a speed-governing switch.

A still further object is to provide an alternating current motor in which the speed-governing switch is required to handle only a relatively small current.

A further object is to provide a single-phase commutator motor having capacitor means in a secondary circuit thereof to control torque and speed and to improve the operation of the motor.

A still further object is to provide an alternating current commutator motor which shall minimize sparking at the brushes.

The invention further consists in the several features hereinafter described and claimed.

In the accompanying drawings, illustrating certain embodiments of the invention, Fig. 1 is a diagrammatic view of an alternating current motor arranged in accordance with the invention;

Fig. 2 is another diagrammatic view thereof showing the stator winding in developed form, some of the circuit elements being omitted;

Fig. 3 is a detail view of the wound stator;

Fig. 4 is a diagrammatic view of a modified form of motor;

Fig. 5 is another diagrammatic view of the motor of Fig. 4 showing the stator winding in developed form, some of the circuit elements being omitted, and Fig. 6 is a diagrammatic view of another modified form of motor.

In the form of electric motor shown in Figs. 1 to 3, the numerals 10 and 11 respectively designate a stator and a rotor each having a magnetizable core, the stator core, Fig. 3, being preferably of the slotted type like that of a polyphase induction motor. The rotor or armature 11 carries a commuted winding 12 connected to a commutator 13 on which brushes 14 bear. In the case of the two-pole motor illustrated,

2 the brushes are disposed at diametrically opposite points of the commutator. The brushes are connected by conductors 15 to single-phase alternating current mains 16 having a control switch 17. In some instances, an adjustably tapped auto-transformer 18 is provided to vary the voltage applied to the armature.

The armature winding 12 forms the primary or inducing winding of a transformer, the axis of polarization coinciding with the brush axis, and the magnetic flux passing through the annular stator core.

The stator core carries a secondary winding comprising two coils 19 of the distributed concentric type having their axis of polarization aligned with the brush axis, each coil preferably extending over approximately 180° of polar arc. The stator core is further provided with a closed winding 20 similar to the armature winding and having two sets of taps 21 and 22 which are selectively connected to the stator winding 19, as hereinafter described, permitting reversal of the motor. The taps 21 and 22 are so placed that the selected axes of polarization of the closed winding 20 are spaced approximately 30° on opposite sides of the axis of the secondary winding 19 and the brush axis.

The stator winding 20, in addition to being inductively related to the armature, is connected in circuit with the secondary winding 19 so as to receive current therefrom, the circuit connection being established through switches 23 by which the winding 19 is selectively connected to the taps 21 and 22 of the stator winding 20. The windings 19 and 20 are connected in cumulative or aiding relation. The circuit connection preferably includes a large series capacitance formed by one or more capacitors 24, the capacitors avoiding excessive current flow at or near synchronous speed and also acting to improve the power factor. Each capacitor is here shown to have a switch 25 in series therewith, thus forming a torque and speed control. In some instances, the capacitors may be short-circuited by a switch 26, or shunted by an adjustable resistor or inductor 27 which is in series with a switch 28. The capacitor bank has a relatively large capacitance, usually 40 microfarads or more, the value depending on the size of the motor. A further speed control device consists of an adjustable resistor or inductor 29 which is connected in series between the stator windings and which may be short-circuited by a switch 30.

As hereinafter more fully described, the motor possesses series characteristics, its speed increasing with a decrease of load. In order to maintain a constant motor speed under varying loads, the motor is provided with a speed regulator or governor 31, such as the centrifugal type shown in my United States Patent No. 1,767,146, issued June 24, 1930. The governor is driven by motor and includes a pair of switch-forming contacts 32 at least one of which is vibratory. In the present case, the switch contacts are connected in series in the secondary circuit of the motor, so as to control the secondary current and thus maintain a constant motor speed. The governor is provided with suitable contact protecting means, such as a shunting condenser 33 and a resistor or inductor 34, the latter having a series control switch 35. A switch 36 serves to short-circuit the governor contacts when it is desired to operate the motor without governor control.

By placing the governor contacts in the secondary circuit of the motor, the current passing through these contacts can be considerably reduced for a given motor load, particularly when the number of turns in the secondary windings 19 and 20 is somewhat greater than the number of turns in the primary or inducing winding of the armature 11, providing a step-up voltage ratio.

In the operation of the motor of Figs. 1 to 3, alternating current flows through the wound armature 11 from the mains, and induces a voltage in the stator windings 19 and also to some degree in the stator winding 20. Alternating current then flows in the secondary circuit formed by connected stator windings 19 and 20, the governor contacts 32, and one or more of the large capacitors 24, establishing a magnetic field which reacts with the current-carrying armature to cause rotation of the armature. The armature then increases in speed until the governor contacts open, whereupon the secondary current drops, causing the armature speed to drop slightly. The governor contacts again close, and the cycle is repeated. The stator windings 19 and 20 may be considered to form a resultant field, the axis of polarization of which is approximately 15 electrical degrees from the brush axis. The relation of the stator windings also appears to produce magnetic fields which differ in phase and which exert a smooth torque by their interaction with the rotor currents, the result being that the motor runs quietly and efficiently over a wide range of speed. These characteristics further permit satisfactory control of the motor by the governor switch, the motor remaining relatively quiet in operation when this switch is in use. During operation of the motor, very little or no sparking occurs at the commutator. In the neighborhood of synchronous speed, a heavy current will tend to flow in the secondary circuit, but the capacitor or capacitors 24 will prevent excessive flow of current. The capacitor bank also serves as a speed and torque control. By limiting the capacitance, overloading of the motor at low speeds will be prevented. The capacitance also improves the power factor of the motor.

To reverse the motor, the switches 23 are thrown to their opposite position. In some instance, the motor may be reversed by "plugging." If the motor is not too large, it may be started by placing it directly across the line, without danger of drawing excessive current.

The modified form of electric motor shown in Figs. 4 and 5 is generally similar to the motor of Fig. 1, except that the closed stator winding 20 of Fig. 1 is replaced by two sets of distributed concentric windings 50 and 50', similar to the winding 19, and selectively connected in series therewith by switches 23. The axes of polarization of the windings 50 and 50' are spaced approximately 30 electrical degrees on opposite sides of the brush axis. The secondary circuit of the motor is otherwise the same as that of Fig. 1. The windings 50 and 50' are selectively included in the secondary circuit to permit operation of the motor in either direction. The motor may also be reversed by shifting the brushes 14 or by providing two selectively usable sets of brushes, in which case the stator winding 50' may be omitted. For clarity in illustration, the winding 50' is omitted from Fig. 5. The motor of Figs. 4 and 5 operates in the same manner as the motor of Fig. 1 and possesses similar characteristics.

In the modified form of electric motor shown in Fig. 6, the stator is in the primary circuit and the rotor or armature is in the secondary circuit. The stator is provided with a winding 51 of the distributer concentric type connected to the supply mains 16, either directly or through an autotransformer 18. The rotor 53 is provided with two commuted windings 54 and 55 connected to respective commutators 56 and 57 on which bear respective sets of brushes 58 and 59. The axis of the brushes 58 is aligned with the axis of polarization of the stator winding 51, while the axis of the brushes 59 is angularly spaced approximately 30 electrical degrees from the axis of polarization of the stator windings. The two commuted rotor windings are connected in series in a secondary circuit like that of Fig. 1, including governor switch contacts 32. The rotor or secondary windings preferably have a relatively large number of turns so as to limit the secondary current which flows through the governor contacts. The voltage induced in the secondary circuit is divided between the commutators.

The operation and operating characteristics of the motor of Fig. 6 are similar to those of the motor of Fig. 1. The motor shown in Fig. 6 may be reversed by shifting the brushes 59 through 60° in a counterclockwise direction, or by shifting both sets of brushes through 30° in a counterclockwise direction. Another reversing arrangement consists in providing two selectively usable sets of the stator windings 51 spaced 30 electrical degrees, in the manner of the stator windings 19 and 50 of Fig. 5.

For traction use and certain other applications, the governor switch 31 of each form of motor may be omitted or may be short-circuited by the switch 36, or the governor switch may be used as a speed-limiting device. For traction use and the like, the speed and torque of the motor may be regulated entirely by varying the amount of capacitance in the secondary circuit, and if desired the primary winding may remain connected to the line when the secondary circuit is open.

What I claim as new and desire to secure by Letters Patent is:

1. An alternating current commutator motor, comprising a stator member, a rotor member cooperating therewith, a primary winding on one of said members, a secondary circuit including a secondary winding on the other member, the winding on the rotor member being commuted, said windings having substantially aligned axes of polarization, and a third winding on one of said members connected in series with the other winding on the same member and having its axis of polarization angularly spaced from the axis of the series-connected winding approximately 30 electrical degrees.

2. An alternating current commutator motor, comprising a stator member, a rotor member cooperating therewith, a primary winding on one of said members, a secondary circuit including a secondary winding on the other member, the winding on the rotor member being commuted, said windings having substantially aligned axes of polarization, a third winding on one of said members connected in series with the other winding on the same member and having its axis of polarization angularly spaced from the axis of the series-connected winding approximately 30 electrical degrees, and a capacitor in said secondary circuit.

3. An alternating current commutator motor, comprising a stator member, a rotor member cooperating therewith, a primary winding on one of said members, a secondary circuit including a secondary winding on the other member, the winding on the rotor member being commuted, said windings having substantially aligned axes of polarization, a third winding on one of said members connected in series with the other winding on the same member and having its axis of polarization angularly spaced from the axis of the series-connected winding approximately 30 electrical degrees, and speed-responsive switch means in said secondary circuit.

4. An alternating current commutator motor, comprising a stator member, a rotor member cooperating therewith, a primary winding on one of said members, a secondary circuit including a secondary winding on the other member, the winding on the rotor member being commuted, said windings having substantially aligned axes of polarization, a third winding on one of said members connected in series with the other winding on the same member and having its axis of polarization angularly spaced from the axis of the series-connected winding approximately 30 electrical degrees, and a capacitor and speed-responsive switch means in said secondary circuit.

5. An alternating current commutator motor, comprising a stator member, a rotor member cooperating therewith, a primary winding on one of said members, a secondary circuit including a secondary winding on the other member, the winding on the rotor member being commuted, said windings having substantially aligned axes of polarization, a third winding on one of said members connected in series with the other winding on the same member and having its axis of polarization angularly spaced from the axis of the series-connected winding approximately 30 electrical degrees, and capacitor means of adjustable capacitance in said secondary circuit to variably limit the motor torque.

6. An alternating current commutator motor, comprising a stator member, a rotor member cooperating therewith, a primary winding on one of said members, a secondary circuit including a secondary winding on the other member, the winding on the rotor member being commuted, said windings having substantially aligned axes of polarization, a third winding on one of said members connected in series with the other winding on the same member and having its axis of polarization angularly spaced from the axis of the series-connected winding approximately 30 electrical degrees, and adjustable impedance means in said secondary circuit.

7. An alternating current commutator motor, comprising a stator member, a rotor member cooperating therewith, a primary winding on one of said members, a secondary circuit including a secondary winding on the other member, the winding on the rotor member being commuted, said windings having substantially aligned axes of polarization, a third winding on one of said members connected in series with the other winding on the same member and having its axis of polarization angularly spaced from the axis of the series-connected winding approximately 30 electrical degrees, the transformer formed by the motor having a step-up voltage ratio.

8. An alternating current commutator motor, comprising a stator member, a rotor member cooperating therewith, a primary winding on one of said members, a secondary circuit including a secondary winding on the other member, the winding on the rotor member being commuted, said windings having substantially aligned axes of polarization, and a third winding on the member with the secondary winding and connected in series with said secondary winding, said third winding having its axis of polarization angularly spaced from the axis of the secondary winding approximately 30 electrical degrees.

9. An alternating current motor, comprising a rotor having a commuted primary winding, a stator having a pair of secondary windings in inductive relation to said primary winding and connected in series in a secondary circuit, the axes of polarization of said secondary windings being angularly displaced, one of said secondary windings having its axis of polarization substantially aligned with the axis of polarization of the primary winding, and a capacitor in said secondary circuit.

10. An alternating current motor, comprising a rotor having a commuted primary winding, and a stator having a pair of secondary windings in inductive relation to said primary winding and connected in series in a secondary circuit, the axes of polarization of said secondary windings being angularly displaced, one of said secondary windings having its axis of polarization substantially aligned with the axis of polarization of the primary winding, and the other secondary winding being a closed armature-type winding.

11. An alternating current motor, comprising a rotor having a commuted primary winding, and a stator having a pair of secondary windings in inductive relation to said primary winding and connected in series in a secondary circuit, the axes of polarization of said secondary windings being angularly displaced, one of said secondary windings having its axis of polarization substantially aligned with the axis of polarization of the primary winding, both of said secondary windings being distributed concentric windings.

12. An alternatng current motor, comprising a stator having a primary winding, a rotor having a pair of commuted secondary windings connected in series in a secondary circuit and arranged in inductive relation to said primary winding, the axes of polarization of said secondary windings being angularly displaced, one of said secondary windings having its axis of polarization substantially aligned with the axis of polarization of the primary winding.

13. An alternating current motor, comprising a stator having a primary winding, a rotor having a pair of commuted secondary windings connected in series in a secondary circuit and arranged in inductive relation to said primary winding, the axes of polarization of said secondary windings being angularly displaced, one of said secondary windings having its axis of polarization substantially aligned with the axis of polarization of the primary winding, and a capacitor in said secondary circuit.

14. An alternating current commutator motor, comprising a stator member, a rotor member cooperating therewith, primary winding means on one of said members, a secondary circuit including secondary winding means on the other member, the winding means on the rotor member being commuted, and capacitor means and speed-responsive switch means connected in series in said secondary circuit.

ROYAL LEE.